United States Patent [19]

Kawasaki et al.

[11] Patent Number: 4,874,511
[45] Date of Patent: Oct. 17, 1989

[54] APATITE CHROMATOGRAPHY COLUMN SYSTEM

[75] Inventors: Tsutomu Kawasaki, Tokyo; Wataru Kobayashi, Tsuruoka, both of Japan

[73] Assignee: Koken Co., Ltd., Tokyo, Japan

[21] Appl. No.: 259,767

[22] Filed: Oct. 19, 1988

Related U.S. Application Data

[63] Continuation of Ser. No. 21,702, Mar. 4, 1987, abandoned.

[30] Foreign Application Priority Data

Mar. 7, 1986 [JP] Japan ................................ 61-49699

[51] Int. Cl.$^4$ ................................................ B01D 15/08
[52] U.S. Cl. ............................ 210/198.2; 210/502.1; 210/510.1; 55/386; 423/308
[58] Field of Search .................. 210/635, 656, 198.2, 210/502.1, 510.1; 502/8, 208, 400; 423/308; 55/386

[56] References Cited

U.S. PATENT DOCUMENTS

| | | | |
|---|---|---|---|
| 3,488,922 | 1/1970 | Kirkland | 210/198.2 |
| 3,509,070 | 4/1970 | Lapidow | 423/308 |
| 3,737,516 | 6/1973 | Jenner | 423/308 |
| 4,070,283 | 1/1978 | Kirkland | 210/198.2 |
| 4,070,286 | 1/1978 | Iler | 210/198.2 |
| 4,131,542 | 12/1978 | Bergna | 210/542 |
| 4,335,086 | 6/1982 | Spencer | 423/308 |
| 4,389,385 | 6/1983 | Ramsay | 210/198.2 |
| 4,477,492 | 10/1984 | Bergna | 210/198.2 |
| 4,483,773 | 11/1984 | Yang | 210/656 |
| 4,636,316 | 1/1987 | Harris | 210/198.2 |
| 4,655,917 | 4/1987 | Shackelfurd | 210/198.2 |
| 4,676,898 | 6/1987 | Saxena | 210/656 |

FOREIGN PATENT DOCUMENTS

| | | | |
|---|---|---|---|
| 59-145087 | 8/1984 | Japan | 210/502.1 |
| 60-198458 | 10/1985 | Japan | 210/198.2 |
| 62-202808 | 9/1987 | Japan | 210/198.2 |
| 710928 | 1/1980 | U.S.S.R. | 502/208 |

OTHER PUBLICATIONS

Snyder, Introduction to Modern Liquid Chromatography John Wiley & Sons, Inc., New York, 1979, pp. 177-180 & 203-204.

Pachla, Precolumn for High Performance Liquid Chromatography, Analytical Chemistry, vol. 48, No. 1, Jan. 1976, p. 237.

Tiselius, "Protein Chromatography on Calcium Phosphate Columns," Archives of Biochemistry & Biophysics 65, pp. 132-155 (1956).

Primary Examiner—Ernest G. Therkorn
Attorney, Agent, or Firm—Birch, Stewart, Kolasch & Birch

[57] ABSTRACT

In an adsorbent for use in chromatography comprised of secondary particles formed by aggregation of primary particles in the form of fine crystals of hydroxyapatite, the aggregated primary particles are sintered so as to be bonded together. The adsorbent is produced by heating the secondary particles at a temperature not lower than 300° C. and not higher than the decomposition temperature thereof, and has significantly improved repetitive using properties. In a column system for use in chromatography, there are provided a main column packed with the above described adsorbent and a precolumn packed with a second adsorbent comprised of conventional hydroxyapatite particles. This column has also a significantly improved repetitive using properties.

6 Claims, 6 Drawing Sheets

APATITE CHROMATOGRAPHY COLUMN SYSTEM

This application is a continuation of application Ser. No. 021,702, filed on Mar. 4, 1987, now abandoned.

BACKGROUND OF THE INVENTION

1. Field of the Invention

The present invention relates to an adsorbent for use in chromatography, more particularly, the present invention relates to an adsorbent which comprises hydroxyapatite particles, a method of producing the adsorbent, and a column system for use in chromatography makes use of such adsorbent.

2. Description of the Prior Art

The term "hydroxyapatite" as used herein is intended to define a chemical substance having a formula $Ca_{10}(PO_4)_6(OH)_2$ (unit cell of hexagonal system: $a \wedge b = 120°$, $a \wedge c = b \wedge c = 90°$, $|a| = |b| = 9.42$ Å and $|c| = 6.88$ Å) and being a species of calcium phosphates among apatite compounds belonging in turn to a hexagonal system $P6_{3/m}$ having a basic composition of $M_{10}(ZO_4)_6X_2$, wherein $M = Ca$, $Z = P$ and $X = OH$. The basic composition may also be considered as a monoclinic system $P2_{1/b}$ which is double the first stated basic composition. This hydroxyapatite is hereafter referred to as HAp.

These HAp particles exhibit superior properties in chromatographic separation or in substance separation or development when used as the adsorbent packed or charged into a column or as a stationary phase agent in the column in column chromatography. Thus it is possible with a chromatography using these particles as the adsorbent packed in the column, or HAp chromatography, to realize high acuteness and precision separation and fractionation of substances having a minute difference in structure from one another. This was difficult to achieve with the use of the prior-art adsorbents such as ion exchange resins, activated alumina and calcium carbonates. These substances may include biological macromolecule materials having a molecular weight of $10^4$ to $10^9$ Dalton, such as, proteins, including immunoglobulin, interferon or enzymes, or nucleic acids, such as RNA, DNA or plasmids or viruses. These are at the present time used as means that are indispensable for high purity separation and refining of a variety of ultimately useful substances obtained by gene recombination, cell fusion or cell culture en masse.

It will be noted that, for stable chromatographic separation in column chromatography having high precision and efficiency, it is essential that, in addition to the superior properties in chromatographic separation of the adsorbent particulate material packed into the column as the stationary phase, the following basic properties are required.

(a) That the sample fluid and the carrier fluid introduced into and circulated through the column, so as to flow through interstices among the packed adsorbent particles, will have a flow pattern that is as uniform as possible at any point in the transverse section of the column;

(b) and that the fluid flow rate through the column per unit sectional area and unit time is as high as possible.

The uniform fluid flow pattern at any point in the sectional column area as per item (a) above may be realized when the size of the individual adsorbent particles packed in the column is small and the extent of the particle size fluctuations is also small, the extent of the fluctuations in the size of the interstices among the packed particles at each point in the sectional plane of the column, is reduced. However, too small a size of the individual particles would result in increased resistance being presented to the fluids introduced into the column and correspondingly lowering of the fluid flow rate in the column.

Thus, for realizing a stable chromatographic separation having high precision and efficiency, it is essential that the adsorbent particles that are packed into the column exhibit superior properties of chromatographic separation, that the individual particles be of a size large enough to procure a flow level through the column which is higher than a prescribed value, and that the particle size be uniform and have only small size fluctuations.

Thus, in HAp chromatography, the following type A and type B materials are predominantly used for packings in a chromatographic column. In addition, the following type C particles have been discovered by the KOKEN Co., Ltd., the assignee of the present invention.

(1) Type A

The type A material is the HAp crystal particles obtained by the Tiselius method proposed by A. Tiselius, S. Hjertén and Ö. Levin in Arch. Biochem. Biophys., 65, 132 (1956). These HAp particles may be produced by having a suitable alkali act on an aqueous suspension of crystal particles of Brushite ($CaHPO_4 \cdot 2H_2O$) used as the starting material. The particles of the type A are substantially monocrystal plate- or flake-like particles of a larger crystal size having a thickness of 1 to 3 microns, a mean diameter along the long axis of the order of tens of microns and having a shape which is substantially the replica of the shape of the Brushite crystal particles used as the starting material.

(2) Type B

The type B material is the secondary particles composed of aggregated or flocculated primary particles that are in the form of fine HAp crystals. In general, the B type particles are produced by the following method. An aqueous solution or suspension of calcium salts such as $Ca(OH)_2$, $CaCl_2$, $Ca(NO_3)_2$ or $Ca(CH_3COO)_2$ is mixed under a basic condition with an aqueous solution of $PO_4$ salts such as $NH_4H_2PO_4$, $(NH_4)_2HPO_4$ or $H_3PO_4$. In such a manner, fine primary HAp crystal particles are produced with a particle size of usually not larger than 1 micron. The liquid suspension of these primary crystals are spray dried to produce substantially spherical secondary particles having a diameter of 1 to 10 microns through desiccation and aggregation of the primary HAp particles.

(3) Type C

The type C material is the substantially monocrystal HAp particles produced by the method disclosed in the copending Japanese Patent Application No. 18868/1986 of the assignee of the present invention. Crystal particles of Brushite are in general, as described above, plate-like or flake-like crystal particles of a relatively large crystal size having a thickness of 1 to 3 microns and a mean diameter of several tens of microns. When these particles are heated to a range of temperatures of not lower than the dehydration and phase transition temperature (about 75° C.) and not higher than the decomposition temperature thereof, the particles undergo the dehydration and phase transition (i.e. water of crystallization is removed) so as to turn into crystal particles of monetite. When Brushite crystal particles are turned to monetite crystal particles through dehydration and phase transition, there occurs a phenomenon in which the resultant crystal particles are crushed within a plane of the plate-like or flake-like crystal into smaller pieces having a thickness of 1 to 3 microns and a diameter of several micron, forming aggregation of monetite crystal particles of a shape like a small plate, which are relatively uniform in size and shape. The phenomenon of the crush is possibly considered to be caused by stress associated with internal strain appearing in the crystal due to the dehydration and phase transition.

Thereafter, the monetite crystal particles are acted upon by alkali (NaOH.KOH, etc.) to be turned into hydroxyapatite (HA) crystal particles having the shape inherited from the monetite crystal particles. Namely, the thickness thereof ranges from 1 to 3 microns, the diameter is several microns, and the particles have a shape of a small plate and are generally uniform in size.

In a procedure to finally produce small-sized HA particles which are generally uniform in size and shape, crystal particles of Brushite may be used as the starting material. The particles are subjected to the dehydration and phase transition so as to be turned into monetite crystal particles, which are then acted upon by alkali, thereby producing hydroxyapatite crystal particles. Alternatively, there may be used as the starting material the monetite crystal particles produced in advance through the dehydration and phase transition by heating the Brushite crystal particles such that the monetite crystal particles are subjected to alkali, thereby producing hydroxyapatite crystal particles.

The dehydration and phase transition of the Brushite crystal particles may be achieved by heating suspension of the crystal particles in a range of temperatures running from the temperature of dehydration and phase transition to the boiling point of the suspension, or a dryer may be used to heat the Brushite crystal particles in a range of temperatures not lower than the temperature of dehydration and phase transition and not higher than the temperature of decomposition of the particles.

In summary of the above; the starting Brushite crystal particles are first heated to a range of temperatures of not lower than the dehydration and phase transition temperature and not higher than the decomposition temperature, so as to be converted on dehydration and phase transition into crystal particles of monetite CaHPO$_4$, these monetite crystal particles being subsequently acted upon by a suitable alkali to produce substantially monocrystal HAp particles. The resulting HAp particles are produced in such a manner that the relatively large-sized plate- or flake-like starting Brushite crystal particles are crushed, within the crystal plane, to smaller pieces having a size of the order of several microns. Thus, these C type particles in their entirety, are uniform in size and shape and are 1 to 3 microns in thickness and several microns in diameter. Thus the C type particles are subject to lesser fluctuations in size and shape than the aforementioned A-type large-sized plate- or flake-like HAp particles having the size and shape that are the replica of the starting Brushite crystal particles. Hence, the C type particles are more desirable than the A type particles when used as the adsorbent for chromatography.

Insofar as the aforementioned basic properties are concerned, that is, the uniform flow pattern in item (a) and uniform flow rate in item (b), the B type primary HAp particles, aggregated into the secondary particles rank first in evaluation among the three types of the materials of the A, B and C type HAp particles.

However, the B type particles are markedly inferior to the A or C type particles with respect to the repetitive use properties or to the durability of the column packed with these particles, such that column exchange or adsorbent re-packing will necessarily be performed prematurely.

More specifically, while the column packed with the type A or C particles may be repetitively used more than 50 times, the column packed with the type B particles may be repetitive used at the most, ten times, after which the chromatograms begin to present inaccuracies or abnormalities and thus an indication that the column is nearly depleted will be outputted. The reason for the column having such a short service life may be summarized as follows.

With the conventional B-type particles, that is, the primary particles in the form of fine HAp crystals desiccated and aggregated into secondary particles, the force binding the aggregated primary particles together is not so strong that, when the particles are packed as the stationary phase medium in the column, that in order to perform the chromatographic operation, the aggregated primary particles lying on the surface of the secondary particles, are sequentially disengaged and disengaged with relative ease, under the force of circulation of the fluid introduced into the column. With the repetition of the chromatographic operation, the flow interstices formed between any adjacent secondary particles packed in the column are locally, gradually stopped with the sequentially disengaged minute primary particles, such that the fluid introduced into the column is then caused to flow mainly along the flow interstices among the secondary particles this flow having not as yet been stopped, thus producing a locally offset circulation pattern. The result is that the flow pattern or velocity of the introduced fluid at each point on the sectional plane of the column will become progressively non-uniform with the lapse of time, such that, beyond a certain limit of the non-uniformities, the manner of development or adsorption of the sample material on the packed adsorbent will become non-uniform, resulting in that abnormalities or inaccuracies would necessarily be produced in the output chromatogram.

SUMMARY OF THE INVENTION

It is therefore an object of the present invention to provide an adsorbent for use in chromatography which is comprised of B type particles, that is, the secondary particles formed by aggregation of the primary particles of the fine HAp crystals, and having a significantly improved repetitive using properties.

It is another object of the present invention to provide a method of producing such an adsorbent for use in chromatography.

It is a further object of the present invention to provide a column system for chromatography makes use of such an adsorbent for chromatography.

In accordance with the present invention, an adsorbent for use in chromatography comprises secondary particles composed of aggregated primary particles that are in the form of fine crystals of hydroxyapatite, said aggregated primary particles being previously sintered so as to be bonded together.

In accordance with the present invention, a method of producing an adsorbent for use in chromatography comprises the steps of aggregating primary particles in the form of fine crystals of hydroxyapatite to form secondary particles, and heating said secondary particles at a temperature not lower than about 300° C. and not higher than the decomposition temperature thereof.

In accordance with the present invention, a column system for use in chromatography comprises a main column packed with an adsorbent composed of secondary particles formed by aggregation of primary particles that are in the form of fine hydroxyapatite crystals, and a precolumn or sub-column that is provided at the fluid inlet into said main column so as to be connected in fluid communication to or disconnected from said main column, that is packed with a second adsorbent consisting of hydroxyapatite particles having resistivity to chemical and physical loads applied from the fluid introduced into the column. The primary particles that are aggregated and packed into the main column have previously been sintered so as to be bonded together. The second adsorbent consisting of hydroxyapatite crystal particles packed into the precolumn are hydroxyapatite particles that are produced by causing an alkali to act on Brushite crystal particles used as the starting material.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

The adsorbent of the present invention consists of primary particles in the form of fine HAp crystals that are aggregated to form secondary particles, wherein the primary particles thus aggregated are sintered together so that the binding force of the individual particles is much stronger than that of the conventional B type particles, that is, the desiccated and aggregated secondary particles. In such a manner, when the chromatographic operation is executed with the novel secondary particle adsorbent packed into the column so as to be used as the stationary phase medium, the amount of the aggregated secondary particles that is released as time elapses from the surface of the secondary particles under the force of flow of the fluid introduced into the column is practically reduced to an extremely small value as compared to the case wherein the conventional B type particles are used. Hence, the uniform flow pattern and high flow level of the fluid at each point in the cross-section of the column packed with the aforementioned novel secondary particle adsorbent remain at an optimum for a prolonged period of time. Thus the repetitive use properties of the column is significantly improved. Furthermore, as may be seen from the following Examples, the fluid inlet pressure into the column, that is, the fluid inlet pressure necessary to cause the fluid to flow into the column at the prescribed supply rate in ml/min., may be markedly lower than in the case of using the conventional B type particles, whilst the chromatographic operation may be optimized.

According to the method of the present invention, the novel secondary particle adsorbent consisting of the primary particles firmly bonded together as a whole may be produced in large quantities.

In addition, it is possible with the column for chromatography according to the present invention to protract the service life of the main column packed with the secondary particle adsorbent as the stationary phase medium.

Thus, when the fluid is introduced into and circulated through the column packed with the adsorbent in order to effect a chromatographic operation, a larger chemical and physical load acts on the portion of the adsorbent in the column that is disposed towards the fluid inlet to the column. While such portion of the C type or A type HAp adsorbent particles is subject to only slow deterioration as a result of such repetitive load application, the portion of the aggregated secondary particle adsorbent undergoes more prompt deterioration due to such repetitive load application.

Thus, in accordance with the present invention, the main column packed with the secondary particle adsorbent as the stationary phase medium is operatively associated with a precolumn packed with the C type or A type HAp or the like particles having resistivity to both the chemical and physical repetitive load application. Such precolumn is provided as the preliminary column so as to be in communication with or disconnected from the fluid inlet to the main column such that the aforementioned physical and chemical load is sustained by the adsorbent in the precolumn having resistivity to such load. In this manner, the chemical and physical load acting on the secondary particle adsorbent portion lying towards the fluid inlet into the main column packed with such secondary adsorbent is reduced resulting in improved repetitive using properties or service life of the overall main column.

EXAMPLES (1) Five liters of suspension containing 250 grams of Brushite crystal particles is heated so as to be boiled for 180 minutes to cause the dehydration and phase transition of the suspended Brushite crystal particles, thereby obtaining monetite crystal particles. Thereafter, sodium hydroxide (NaOH) weighing 40 grams is added to the suspension, which is stirred and is then heated to be continuously boiled for 60 minutes so as to turn the monetite crystal particles into hydroxyapatite (HA) crystal particles.

The obtained HA crystal particles have a thickness of 1 to 3 microns and a diameter of about $5\pm3$ microns and are generally uniform in size and shape.

(2) Production of the Secondary Particles Composed of Fine HAp Crystal Particles Aggregated Together An aqueous suspension of $Ca(OH)_2$ with a concentration of 24.5 g/l (0.33M) and an aqueous solution of $NH_4H_2PO_4$ with a concentration of 23.0 g/l (0.2M) are mixed together at a ratio of 1:1 and allowed to stand for 3 hours at 40° C. In this manner, there are produced and precipitated fine primary HAp crystal particles having a particle size usually not larger than 1 micron, herein about 0.1 micron, and being substantially free from cell defects, that is, stoichiometric. The resulting aqueous suspension of these primary HAp crystal particles is then spray-dried by using a spray drier manufactured by Yamato Kagaku K.K., DL-41, commercial code number 212708, to produce substantially spherical secondary particles having a diameter in the range of 1 to 10 microns and consisting of the primary HAp crystal particles aggregated together.

The desiccated and aggregated secondary HAp particles produced by the above method are equivalent to the B type adsorbent mentioned above. A portion of these aggregated secondary HAp particles is taken as the reference or comparative sample which is designated herein as the thermally untreated particles B2.

(3) Thermal Treatment (Sintering)

The aggregated HAp secondary particles produced in (2) are packed into an open hearth furnace or crucible and thermally treated by an electrical heating unit at 700° C. for 30 minutes such that the primary particles aggregated as the secondary particles are sintered and bonded together to form the secondary HAp particles. These particles are herein designated as the thermally treated particles B1.

Figure 1:
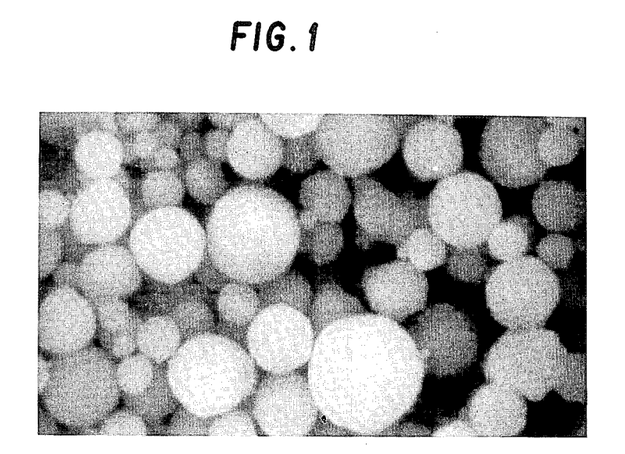
FIG. 1 is a photo taken by a scanning type microscope of an adsorbent for chromatography consisting of secondary particles obtained by aggregating and thermally treating fine HAp primary crystal particles.

FIG. 1 is a photo taken by a scanning type electron microscope of these thermally treated particles B1. It is noted that, when viewed through an electron microscope, the thermally untreated particles B2 are substantially similar in appearance to these thermally treated particles B1 such that these particles B1 and B2 are not distinguishably different from each other.

In general, the thermal treatment temperature of not higher than 300° C. used for sintering the aggregated primary particles together to form the HAp secondary particles is not desirable since the primary particles are not sintered together substantially or at least the binding force resulting from sintering is not sufficient such that the sintering need be performed over a longer time interval. The sintering time may differ with the amount of the secondary particles that are thermally treated at one time or with the mean particle size of the secondary particles and thus need be determined appropriately through, for example, preliminary tests. The thermal processing for about 30 minutes or longer is usually sufficient.

(4) Chromatographic Operation

Figure 2:
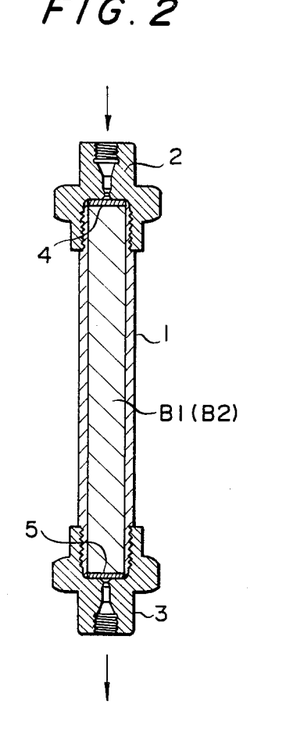
FIG. 2 is a longitudinal section through a straight tube type test column and a comparative column that are used for testing the adsorbent.

The thermally treated particles B1 under item (3) are packed as the stationary phase agent in a stainless steel column 1 used as the column for chromatography having an inside diameter of 6 mm and an effective length of 3 cm (FIG. 2). The numerals 2 and 3 designate a fluid inlet cap and a fluid outlet cap of the column, respectively, while the numerals 4 and 5 designate filter elements disposed at inlet cap 2 and at outlet cap 3, respectively. The thermally treated particles B1 as the stationary phase medium is packed in a column space defined between filter elements 4 and 5. The column is the test column.

On the other hand, a column similar to the test column is similarly packed with the thermally untreated particles B2 under item (2) as the column for chromatography, which is the comparison column.

The following sequence of the chromatographic operations is repeatedly carried out for the test and comparative columns to test their repetitive use properties or durability.

(i) The egg white lysozyme of the hen's egg is used as the sample and the potassium phosphate buffer solution of $PH \approx 6.8$ is used as the carrier liquid in the linear molar concentration gradient elution method.

(ii) The potassium phosphate buffer solution is set to an initial concentration of 1 mM and to a linear concentration gradient of 7 mM/ml.

(iii) The carrier liquid is supplied into the column at the rate of 0.5 ml per minute.

(iv) The temperature used is the ambient temperature.

(4) Test Results

Figure 3:
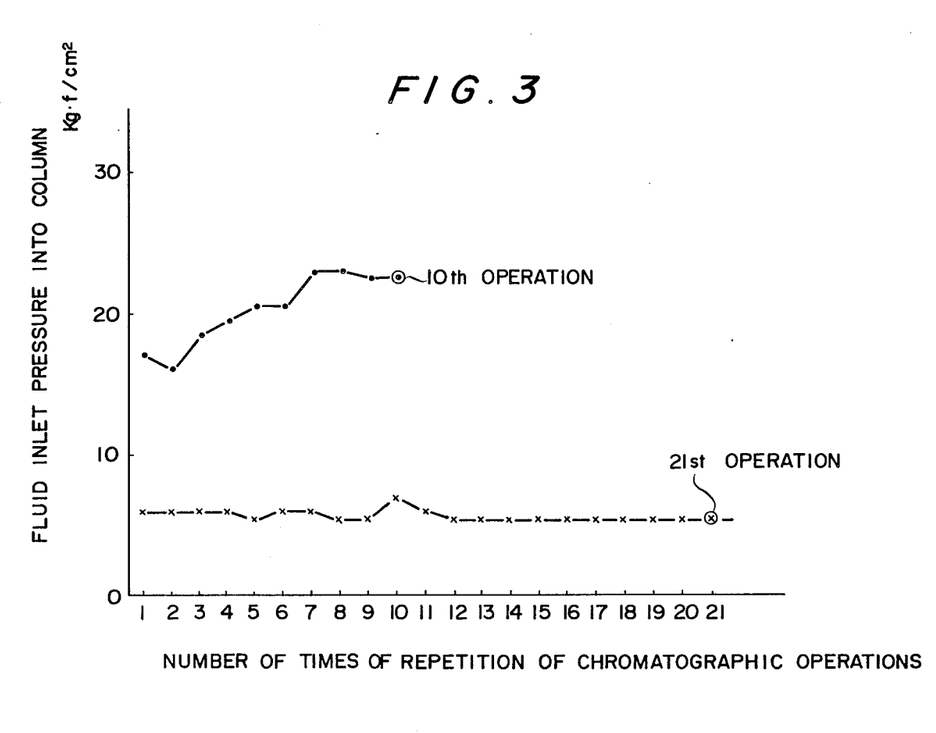
FIG. 3 is a chart showing the results of a test on repetitive using properties or durability of the test and comparative columns.

In FIG. 3, the number of times of repetition of the chromatographic operations is plotted on the abscissa, while the inlet fluid pressure into the column for each chromatographic operation, or the pressure required for maintaining the supply rate setting of the carrier liquid into the column which is 0.5 ml/min., is plotted on the ordinate. The fluid inlet pressure values for the respective chromatographic operations for the test and comparative columns are indicated by marks (x) and (.) respectively.

It is seen from the chart of FIG. 3 that the pressure levels for the test column may be markedly lower than those for the comparative columns throughout the respective operations and that the pressure levels are increased gradually in the case of the comparative columns as the number of times of the chromatographic operation is increased. Thus it may be seen that the test column is practically more useful than the comparative column.

Figure 4A:
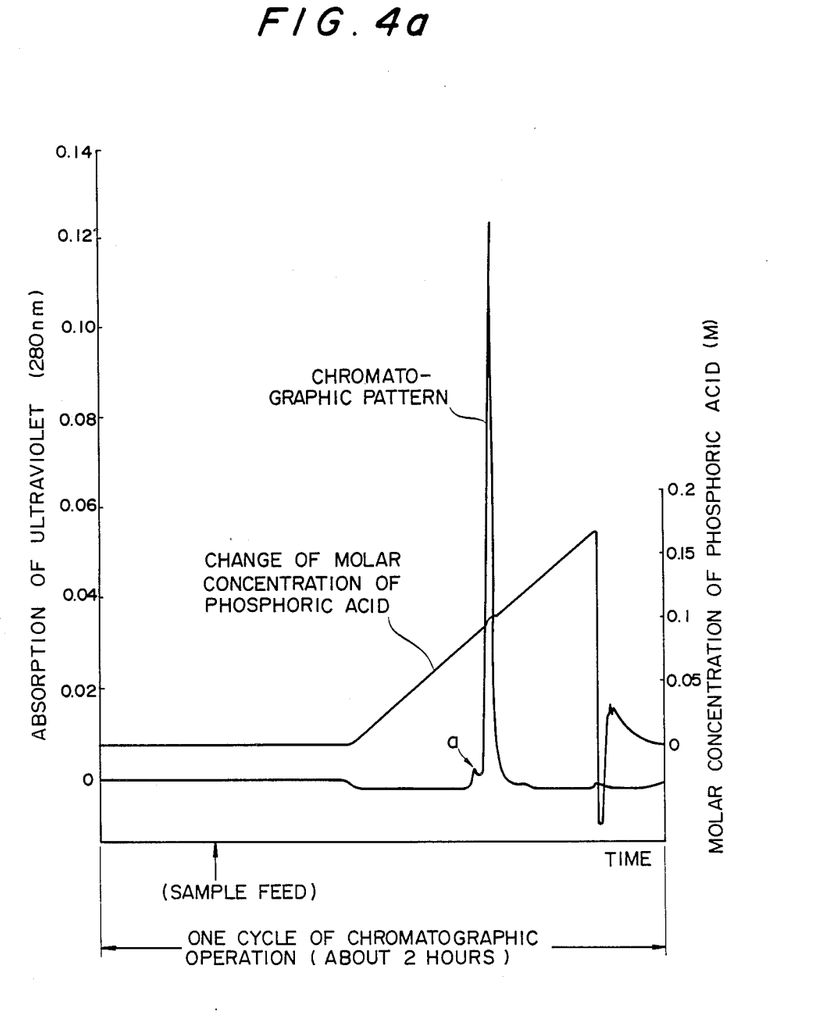
FIG. 4a is a regular chromatogram for the test column.
Figure 5A:
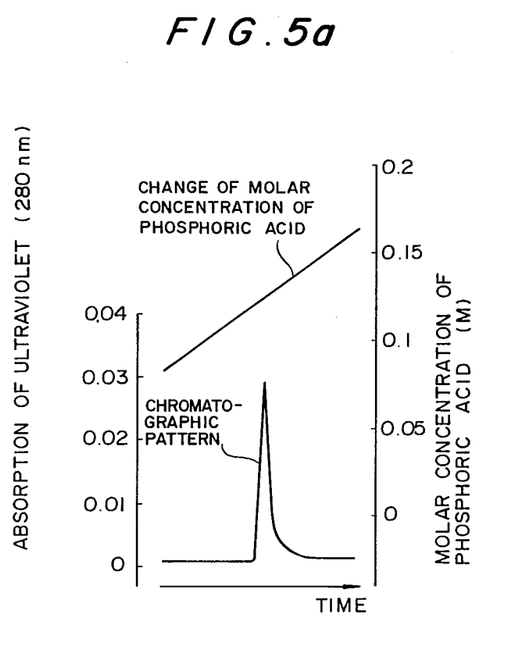
FIG. 5a is a similarly regular chromatogram for the comparative column.

FIG. 4a shows the chromatogram in the regular state obtained with the test column while FIG. 5a shows the same chromatogram obtained with the comparative column. As compared with the regular chromatogram for the test column shown in FIG. 4a, the regular chromatogram for the comparative column of FIG. 5a already shows certain abnormalities that the obtained chromatographic pattern for the lysozyme is lacking in the minute peak a (FIG. 4) that should appear immediately before the main peak.

Figure 5B:
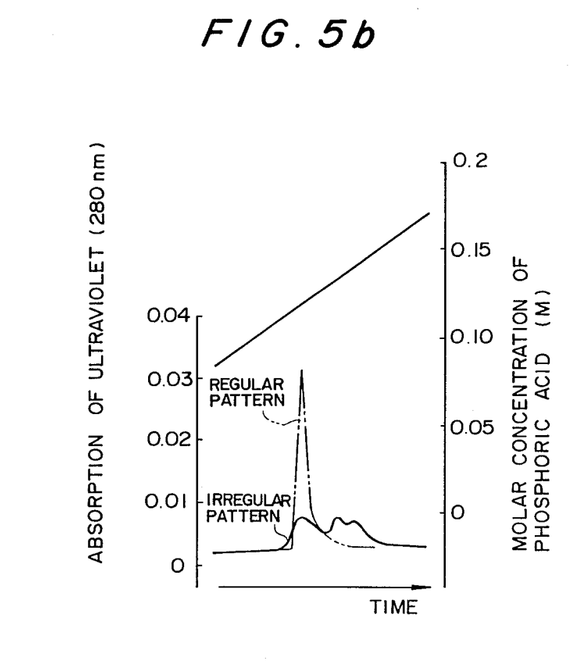
FIG. 5b is a chromatogram showing abnormalities for the comparative column.

In addition, in the case of the comparative column, there is outputted, at the tenth chromatographic operation, an unusual or abnormal chromatogram in which, as shown in FIG. 5b, the chromatographic peak shown by the double-dotted chain line in FIG. 5b and which should appear only once is divided into two or more separate peaks, such that it becomes impossible to carry out the chromatographic operation in the usual manner.

Figure 4B:
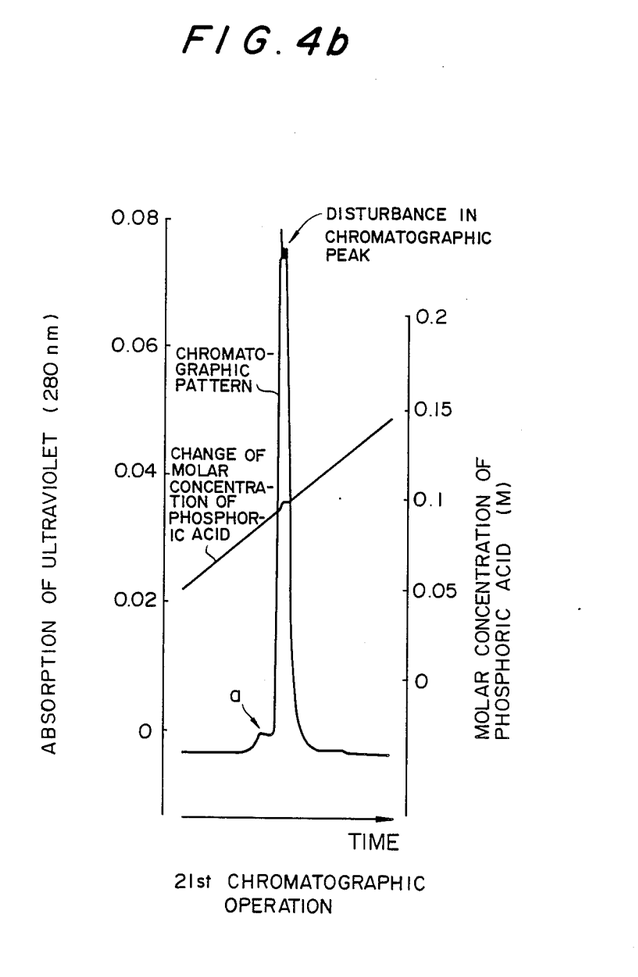
FIG. 4b is a chromatogram for the test column showing symptoms of the incumbent abnormalities.

In the test column, only small peak separation is seen to occur only at the 21st chromatographic operation, as shown in FIG. 4b. Such peak separation is still within the allowable range as to precision such that the column may still be used on end.

Thus it is seen that the column for chromatography packed with the thermally treated particles B1 as the stationary phase medium may be used repeatedly over a larger number of times than the column packed with the thermally untreated particles B2.

Figure 6:
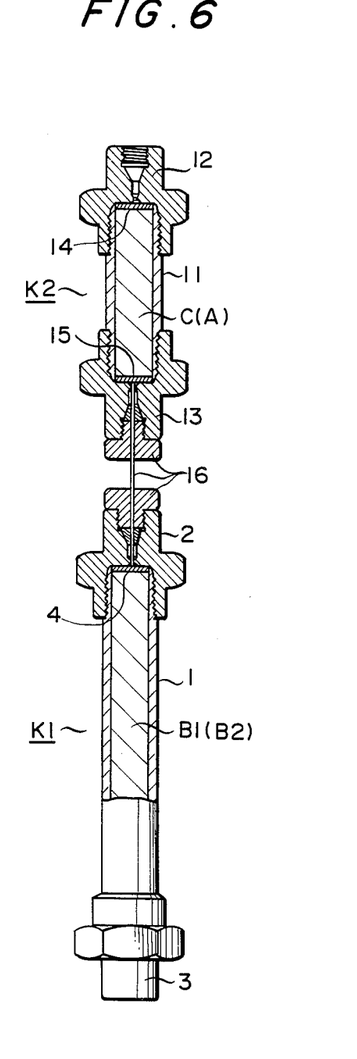
FIG. 6 is a longitudinal section through a column unit comprised of a main column and a precolumn.

FIG. 6 shows an example of a column arrangement comprised of a main column such as that shown in FIG. 2 and packed with the thermally treated particles B1 as the stationary phase medium and precolumn K2 packed with the aforementioned C type or A type HAp monocrystal particles C(A) and connected to the fluid inlet to main column K1 so as to be in fluid communication with or disconnected from the main column. The operation and result are as described above. In the drawing, the numerals 11 to 15 denote a main body of the column, a fluid inlet cap, a fluid outlet cap, an upper filter element and a lower filter element, respectively. The numeral 16 designates a coupling for removably connecting main column K1 and precolumn K2.

From the foregoing it is seen that the present invention provides an adsorbent for chromatography consisting of the secondary particles formed by aggregation of the fine HAp primary crystal particles and having significantly improved repetitive use properties, and a column for chromatography that is superior in repetitive use properties.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A column system for use in chromatography comprising:
    a main column packed with an adsorbent composed of secondary particles formed by aggregation of fine primary hydroxyapatite crystal particles,
    said secondary particles having been sintered, wherein a sintering bond is formed between the aggregated fine primary hydroxyapatite crystal particles; and
    a precolumn provided at the fluid inlet into said main column so as to be connected in communication with or disconnected from said main column packed with a second adsorbent consisting of hydroxyapatite crystal particles having resistivity to the chemical and physical loads applied from the fluid introduced into the column,
    said second adsorbent being either of a first type hydroxyapatite crystal particles or a second type hydroxyapatite crystal particles,
    wherein said first type hydroxyapatite crystal particles having been produced by having an alkali act on crystal particles of brushite used as the starting material, and
    said second type hydroxyapatite crystal particles having been produced by the steps of heating brushite crystal particles used as the starting material, to a temperature range of not lower than the dehydration transition temperature and not higher than the decomposition temperature thereof, to cause dehydration and phase transition of the brushite crystal particles, and thus producing monetite crystal particles, and subsequently acting an alkali on the thus produced monetite crystal particles to produce hydroxyapatite substantially monocrystal particles.

2. The column system for use in chromatography in accordance with claim 1, wherein said fine primary hydroxyapatite crystal particles are particles having a diameter of not more than 1 micron, and said secondary particles substantially spherical particles having a diameter in the range of from 1 to 10 microns.

3. The column system for use in chromatography in accordance with claim 2,
    wherein the fine primary hydroxyapatite crystal particles are particles having a diameter of about 0.1 micron.

4. The column system for use in chromatography in accordance with claim 1, wherein said fine primary hydroxyapatite crystal particles are of substantially stoichiometric chemical composition.

5. The column system for use in chromatography in accordance with claim 1,
    wherein the secondary particles had been sintered at a temperature of not lower than about 300° C. and not higher than the decomposition temperature thereof.

6. The column system for use in chromatography in accordance with claim 5,
    wherein the secondary particles had been sintered at a temperature of 700° C. for 30 minutes.

* * * * *